(12) United States Patent
Baumgartner et al.

(10) Patent No.: US 7,617,221 B2
(45) Date of Patent: Nov. 10, 2009

(54) RENDERING DATABASE QUERIES WITH BLANK SPACE

(75) Inventors: Patrick Baumgartner, Pullman, WA (US); Alisson A. S. Sol, Cambridge (GB); Peter Eberhardy, Seattle, WA (US); Luming Wang, Bellevue, WA (US); Mark Yang, Redmond, WA (US); Amer Shahnawaz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 217 days.

(21) Appl. No.: 11/675,841

(22) Filed: Feb. 16, 2007

(65) Prior Publication Data

US 2008/0201309 A1 Aug. 21, 2008

(51) Int. Cl.
*G06F 17/30* (2006.01)

(52) U.S. Cl. .................. 707/10; 707/3; 707/5; 707/9

(58) Field of Classification Search ............ 707/2, 707/3, 4, 101, 102, 103 Z, 104.1, 5, 9, 10; 715/210, 503; 704/235; 709/205; 702/2; 700/217

See application file for complete search history.

(56) References Cited

U.S. PATENT DOCUMENTS

| | | | |
|---|---|---|---|
| 6,626,959 B1* | 9/2003 | Moise et al. | 715/210 |
| 6,859,805 B1* | 2/2005 | Rogers et al. | 707/9 |
| 6,931,301 B2* | 8/2005 | Kawamura | 700/217 |
| 7,127,672 B1 | 10/2006 | Patterson et al. | |
| 7,185,279 B2 | 2/2007 | Machalek | |
| 2001/0029475 A1* | 10/2001 | Boicourt et al. | 705/30 |
| 2003/0023435 A1* | 1/2003 | Josephson | 704/235 |
| 2003/0084068 A1* | 5/2003 | Harman | 707/200 |
| 2003/0167307 A1* | 9/2003 | Filepp et al. | 709/205 |
| 2004/0034615 A1 | 2/2004 | Thomson et al. | |
| 2005/0015360 A1* | 1/2005 | Cras et al. | 707/2 |
| 2005/0267868 A1 | 12/2005 | Liebl et al. | |
| 2006/0020933 A1 | 1/2006 | Pasumansky et al. | |
| 2006/0085445 A1 | 4/2006 | Thanu | |
| 2006/0085742 A1 | 4/2006 | Harold et al. | |
| 2006/0107196 A1 | 5/2006 | Thanu et al. | |
| 2006/0195427 A1* | 8/2006 | Kilroy | 707/3 |
| 2006/0271841 A1* | 11/2006 | Thanu et al. | 715/503 |

(Continued)

OTHER PUBLICATIONS

Alain Desilets et al., "A Wikis Usable", ACM, Oct. 2005, pp. 3-15.*

(Continued)

*Primary Examiner*—Thuy N Pardo
(74) *Attorney, Agent, or Firm*—Merchant & Gould, P.C.

(57) ABSTRACT

A computer-implemented method includes selecting a first member of a first dimension of a database to be included at a first location in a report. The first member includes first data to be retrieved from the database. A blank space to be added at a second location relative to the first member is also selected. A database query is generated that includes a first instruction to retrieve first data included in the first member. The first instruction is located at a first position in the query and the first data will appear in the report at the first location. The database query also includes a second instruction to retrieve a null set of data. The second instruction is located at a second position in the query and the null set of data will appear in the report at the second location.

20 Claims, 15 Drawing Sheets

U.S. PATENT DOCUMENTS

2007/0050700 A1    3/2007   Simkhay et al.
2007/0106481 A1*   5/2007   Matsumoto et al. ........... 702/20
2008/0183687 A1*   7/2008   Law .............................. 707/4
2008/0201309 A1*   8/2008   Baumgartner et al. .......... 707/4

OTHER PUBLICATIONS

Multidimensional Expressions (MDX) Reference http://technet.microsoft.com/en-us/library/msl45506.aspx, 2 pages.

Working with OLAP Query Results http://publib.boulder.ibm.com/infocenter/mptoolic/v1r0/index.jsp?topic=/com.ibm.db2tools.rdz.doc.gsdq/olapqueriesworkwith1.htm.

Navigating a CompoundCursor for Different Displays of Data http://download-uk.oracle.com/docs/cd/B10501_01/olap.920/a95297/cursors3.htm, 7 pages.

* cited by examiner

Select Members for 'Time'

| Add | Find Next | Find Within | Find All | Add Found | Keep Found | Remove Found | Clear | Save |
|---|---|---|---|---|---|---|---|---|
| Label | | | Quarter | | Year | | Fiscal Year | |
| | | | New York | | | | | |
| ☐ All | | | | | | | | |
| ☐ FY2001 | | | | | | | FY2001 | |
| ☑ Q1 FY2001 | | | Q1 | | FY2001 | | | |
| ☑ Q2 FY2001 | | | Q2 | | FY2001 | | | |
| ☑ Q3 FY2001 | | | Q3 | | FY2001 | | | |
| ☑ Q4 FY2001 | | | Q4 | | FY2001 | | | |
| ☐ FY2002 | | | | | | | FY2002 | |
| ☐ Q1 FY2002 | | | Q1 | | FY2002 | | | |
| ☐ Q2 FY2002 | | | Q2 | | FY2002 | | | |
| ☐ Q3 FY2002 | | | Q3 | | FY2002 | | | |
| ☐ Q4 FY2002 | | | Q4 | | FY2002 | | | |
| ☐ FY2003 | | | | | | | FY2002 | |

Hide Details <<

▶ ◀

Selected members:

Q1 FY2001
Q2 FY2001
Q3 FY2001
Q4 FY2001
FY2001

Remove
Keep
Sort
Insert Blank

Static
Insert Blank

OK   Cancel

*Number of selected members: 3 of 60*
*Number of found members: 2 of 60*

```
500 ─╮
510 ─╮╰
     ╰─ With member [Time].[Quarterly].[] as ""

select
520 ─── {
                [Time].[Quarterly].[Q1 FY2006],
                [Time].[Quarterly].[Q2 FY2006],
                [Time].[Quarterly].[Q3 FY2006],
525 ─╮          [Time].[Quarterly].[Q4 FY2006],
     ╰───────── [Time].[Quarterly].[],
                [Time].[Quarterly].[FY2006]
        }
        *
        {
                [Measures].DefaultMember
530 ─── }
        properties [KEY], IS_DATAMEMBER  on columns,
540 ─── {
                [Account].[Corporate].[Sold Units],
                [Account].[Corporate].[Price/Unit],
                [Account].[Corporate].[Revenue]
        }
550 ─── properties [KEY], IS_DATAMEMBER ,[Account].[Corporate].[PARENTMEMBER]
        on rows from [Sales]
```

FIGURE 5

|   | A | B | C | D | E | F | G |
|---|---|---|---|---|---|---|---|
| 1 |   | Q1 FY2006 | Q2 FY2006 | Q3 FY2006 | Q4 FY2006 |   | FY2006 |
| 2 | Sold Units | 3416 | 36618 | 12223 | 0 |   | 82987 |
| 3 | Price/Unit | 5244 | 2620 | 888 | 0 |   | 6052 |
| 4 | Revenue | 62579 | 90680 | 20206 | 0 |   | 173465 |

Columns: Time

Rows: Account

FIGURE 6

```
800
810     With member [Time].[Quarterly].[] as ""
815     With member [Account].[Corporate].[] as ""

820     select
        {
                [Time].[Quarterly].[Q1 FY2006],
                [Time].[Quarterly].[Q2 FY2006],
825             [Time].[Quarterly].[Q3 FY2006],
                [Time].[Quarterly].[Q4 FY2006],
                [Time].[Quarterly].[],
                [Time].[Quarterly].[FY2006]
        }
        *
        {
830             [Measures].DefaultMember
        }
840     properties [KEY], IS_DATAMEMBER on columns,
845     {
                [Account].[Corporate].[Sold Units],
                [Account].[Corporate].[Price/Unit],
                [Account].[Corporate].[],
850             [Account].[Corporate].[Revenue]
        }
        properties [KEY], IS_DATAMEMBER ,[Account].[Corporate].[PARENTMEMBER]
        on rows from [Sales]
```

FIGURE 8

|   | A | B | C | D | E | F | G |
|---|---|---|---|---|---|---|---|
| 1 |   | Q1 FY2006 | Q2 FY2006 | Q3 FY2006 | Q4 FY2006 |   | FY2006 |
| 2 | Sold Units | 3416 | 36618 | 12223 | 0 |   | 82987 |
| 3 | Price/Unit | 5244 | 2620 | 888 | 0 |   | 6052 |
| 4 |   |   |   |   |   |   |   |
| 5 | Revenue | 62579 | 90680 | 20206 | 0 |   | 173465 |

Columns: Time

Rows: Account

FIGURE 9

```
1100          With
1110
1115          member [Account].[Corporate].[] as ""
              member [Product].[ProductsQ1FY07].[] as ""

1120          select {
                      [Time].[Quarterly].[Q1 FY2006],
1125                  [Time].[Quarterly].[Q2 FY2006],
                      [Time].[Quarterly].[Q3 FY2006],
                      [Time].[Quarterly].[Q4 FY2006],
                      [Time].[Quarterly].[FY2006]
              }
              *
              {
                      [Measures].DefaultMember
1130          }
              properties [KEY], IS_DATAMEMBER on columns,
1140
              {
                      {[Account].[Corporate].[Sold Units]}*{[Product].[ProductsQ1FY07].[Accessories]},
                      {[Account].[Corporate].[Sold Units]}*{[Product].[ProductsQ1FY07].[Accessories]},
                      {[Account].[Corporate].[Sold Units]}*{[Product].[ProductsQ1FY07].[Accessories]},
                      {[Account].[Corporate].[Price/Unit]}*{[Product].[ProductsQ1FY07].[Cards]},
1145                  {[Account].[Corporate].[Price/Unit]}*{[Product].[ProductsQ1FY07].[Cards]},
                      {[Account].[Corporate].[Price/Unit]}*{[Product].[ProductsQ1FY07].[Cards]},
                      {[Account].[Corporate].[]}          *{[Product].[ProductsQ1FY07].[]},
                      {[Account].[Corporate].[Revenue]} *{[Product].[ProductsQ1FY07].[Fixed Lines]},
                      {[Account].[Corporate].[Revenue]} *{[Product].[ProductsQ1FY07].[Fixed Lines]},
                      {[Account].[Corporate].[Revenue]} *{[Product].[ProductsQ1FY07].[Fixed Lines]}
              }
1150          properties [KEY], IS_DATAMEMBER
              ,[Account].[Corporate].[PARENTMEMBER],[Product].[ProductsQ1FY07].[PARENTMEM
              BER] on rows from [Sales]
```

FIGURE 11

|   | A | B | C Q1 FY2006 | D Q2 FY2006 | E Q3 FY2006 | F Q4 FY2006 | G FY2006 |
|---|---|---|---|---|---|---|---|
| 1 |   |   |   |   |   |   |   |
| 2 | Sold Units | Accessories | 7293 | 7922 | 2650 | 0 | 17865 |
| 3 | Sold Units | Accessories | 4678 | 5192 | 1748 | 0 | 11648 |
| 4 | Sold Units | Accessories | 9516 | 9720 | 3070 | 0 | 22605 |
| 5 | Price/Unit | Cards | 207 | 228 | 76 | 0 | 511 |
| 6 | Price/Unit | Cards | 102 | 136 | 49 | 0 | 287 |
| 7 | Price/Unit | Cards | 297 | 264 | 78 | 0 | 639 |
| 8 |   |   |   |   |   |   |   |
| 9 | Revenue | Fixed Lines | 505912 | 601347 | 201149 | 0 | 1308408 |
| 10 | Revenue | Fixed Lines | 159767 | 236120 | 85083 | 0 | 480971 |
| 11 | Revenue | Fixed Lines | 972809 | 854573 | 238316 | 0 | 2065698 |
| 12 |   |   |   |   |   |   |   |
| 13 |   |   |   |   |   |   |   |
| 14 |   |   |   |   |   |   |   |
| 15 |   |   |   |   |   |   |   |
| 16 |   |   |   |   |   |   |   |
| 17 |   |   |   |   |   |   |   |
| 18 |   |   |   |   |   |   |   |
| 19 |   |   |   |   |   |   |   |
| 20 |   |   |   |   |   |   |   |
| 21 |   |   |   |   |   |   |   |

Columns:
Time ▶

Rows:
Account ▶
Product ▶

FIGURE 12

```
1400
       With
1410
       member [Product].[ProductsQ1FY07].[] as ""

select

{
              [Time].[Quarterly].[Q1 FY2006],
              [Time].[Quarterly].[Q2 FY2006],
1420
              [Time].[Quarterly].[Q3 FY2006],
              [Time].[Quarterly].[Q4 FY2006],
              [Time].[Quarterly].[FY2006]
       }
       *
       {
              [Measures].DefaultMember
1430
       }
       properties [KEY], IS_DATAMEMBER on columns,
1440
       {
1442          [Product].[ProductsQ1FY07].[Electronics].Children,
1444          [Product].[ProductsQ1FY07].[],
1446          [Product].[ProductsQ1FY07].[Electronics]
       }
1450   properties [KEY], IS_DATAMEMBER
       ,[Product].[ProductsQ1FY07].[PARENTMEMBER] on rows from [Sales]
```

FIGURE 14

|   | A | B | C | D | E | F | G |
|---|---|---|---|---|---|---|---|
| 1 |   | Q1 FY2006 | Q2 FY2006 | Q3 FY2006 | Q4 FY2006 | FY2006 |   |
| 2 | Televisions | 3416 | 36618 | 12223 | 0 | 82987 |   |
| 3 | Radios | 5244 | 2620 | 888 | 0 | 6052 |   |
| 4 |   |   |   |   |   |   |   |
| 5 | Electronics | 62579 | 90680 | 20206 |   | 173465 |   |

Columns: Time

Rows: Product

FIGURE 15

RENDERING DATABASE QUERIES WITH BLANK SPACE

BACKGROUND

Database reports may often contain large quantities of densely packed information making them difficult to read. Blank spaces, such as blank rows or columns, may be used to delineate the information to increase readability by separating different sections of data within a form or report. In many cases, however, it is difficult to insert blank space in the desired location with the desired functionality.

For example, because the entire database report typically is generated as a single object, the user may have no way to insert blanks in the report. In other cases where the user is permitted to insert blank spaces at specific locations in the report, correct position of the blank spaces relative to other rows or columns in the report can be lost if the number of rows or columns changes.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure is directed to generating database queries that result in selective blank spaces being inserted in reports. Specifically, in creating a database report, a user may select dimensions of a database to be displayed in the report. Members of each dimension may be selected for display, and one or more blank members may be added at a selected location. A database query may then be created that declares one or more blank members of the dimension. Each of the blank members produces a blank space in the database report at the location specified.

In an implementation of a computer-implemented method, a request for a report including data to be retrieved from a database is received. An input allowing for a blank space to be inserted in the report at a specified location is provided. A database query including an instruction configured to add a member to the database that will produce a blank member at the specified location is then generated.

In another implementation of a computer-implemented method, a first member of a first dimension of a database to be included at a first location in a report is selected. The first member includes first data to be retrieved from the database. A blank space to be added at a second location relative to the first location is also selected. A database query is generated that includes a first instruction to retrieve first data included in the first member. The first instruction is located at a first position in the query and the first data will appear in the report at the first location. The database query also includes a second instruction to retrieve a null set of data. The second instruction is located at a second position in the query and the null set of data will appear in the report at the second location.

In an implementation of a computer readable medium storing a query to a database, a declaration of at least one null member of the database containing a null caption is included. A first instruction to retrieve data included in at least one member of the database is also included. The data will appear in the report at a first location. A second instruction to retrieve a null set of data associated with the at least one null member is also included. The null set of data will appear in the report at a second location.

These and other features and advantages will be apparent from reading the following detailed description and reviewing the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

BRIEF DESCRIPTION OF THE DRAWINGS

In the drawings, like numerals represent like elements. In addition, the first digit in three-digit reference numerals and the first two-digits in four-digit reference numerals refer to the figure in which the referenced element first appears.

FIGS. 3 and 4 are screen displays of an interface for selecting members of a dimension;

FIG. 5 is an implementation of a database query generated that includes a blank column;

FIG. 6 is a screen display of a database report that includes blank space;

FIG. 8 is an implementation of a database query generated that includes a blank row and a blank column;

FIG. 9 is a screen display of a database report that includes a blank row and a blank column;

FIG. 11 is an implementation of a database query generated that includes a blank crossjoined row;

FIG. 12 is a screen display of a database report that includes a blank cross-joined row;

FIG. 14 is an implementation of a database query generated that includes blank space that automatically updates; and FIG. 15 is a screen display of a database report that includes blank space that automatically updates.

DETAILED DESCRIPTION OF IMPLEMENTATIONS

This detailed description describes the form and generation of a database query causing a blank space to be inserted in a report as well as a method for creating database queries. Generally, in creating a database report, a user may select dimensions of a database to be included in the database report. Individual members of each dimension may be selected and one or more blank members may be added. A database query may then be created that declares one or more corresponding null members of the dimension to which the one or more blank members were added. This null member produces a blank in the database report at the location specified.

Illustrative Operating Environment

Figure 1:
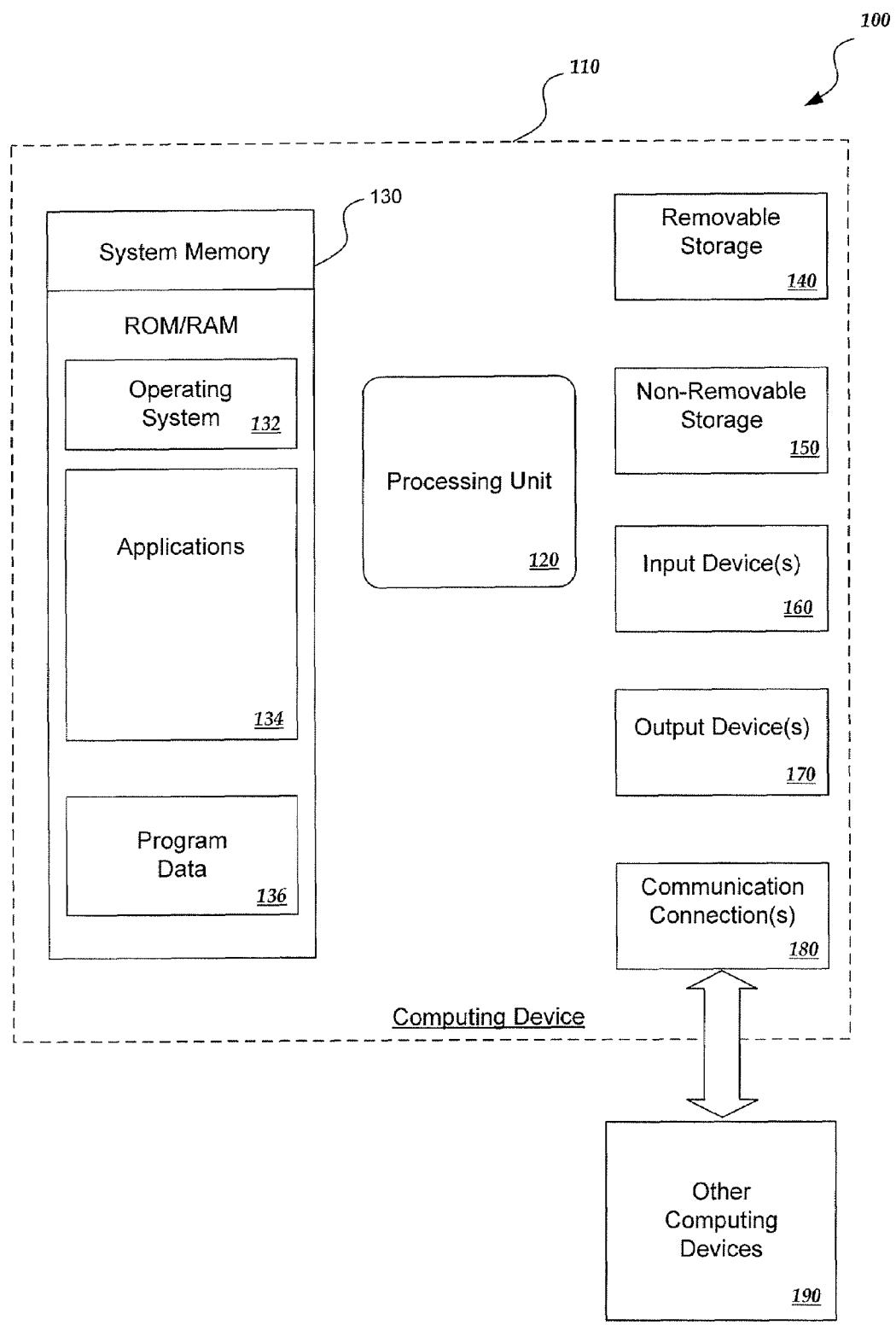
FIG. 1 is a block diagram of an operating environment for implementations of computer-implemented methods and user interfaces as herein described.

Implementations of creating a database query to produce a blank in a database report may be supported by a number of electronic or computerized devices to generate the database query, either locally or over a network. FIG. 1 is a block diagram of a representative operating environment 100.

Referring to FIG. 1, an implementation of an operating environment 100 includes a computing device, such as a computing device 110. In a basic configuration, the computing device 110 may include a stationary computing device or a mobile computing device. The computing device 110 typically includes at least one processing unit 120 and system memory 130. Depending on the exact configuration and type of computing device, the system memory 130 may be volatile (such as RAM), non-volatile (such as ROM, flash memory, and the like) or some combination of the two. The system memory 130 typically includes an operating system 132, one or more applications 134, and may include program data 136.

The computing device 110 may also have additional features or functionality. For example, the computing device 110 may also include additional data storage devices (removable and/or non-removable) such as, for example, magnetic disks, optical disks, or tape. Such additional storage is illustrated in FIG. 1 by removable storage 140 and non-removable storage 150. Computer storage media may include volatile and non-volatile, removable and non-removable media implemented in any method or technology for storage of information, such as computer readable instructions, data structures, program modules or other data. The system memory 130, the removable storage 140 and the non-removable storage 150 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 110. Any such computer storage media may be part of the computing device 110. The computing device 110 may also have input device(s) 160 such as a keyboard, mouse, pen, voice input device, touch input device, etc. Output device(s) 170 such as a display, speakers, printer, etc. may also be included.

The computing device 110 also contains communication connection(s) 180 that allow the device to communicate with other computing devices 190, such as over a network or a wireless network. The communication connection(s) 180 is an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Data Flow Generating a Query Containing Blank Spaces

Figure 2:
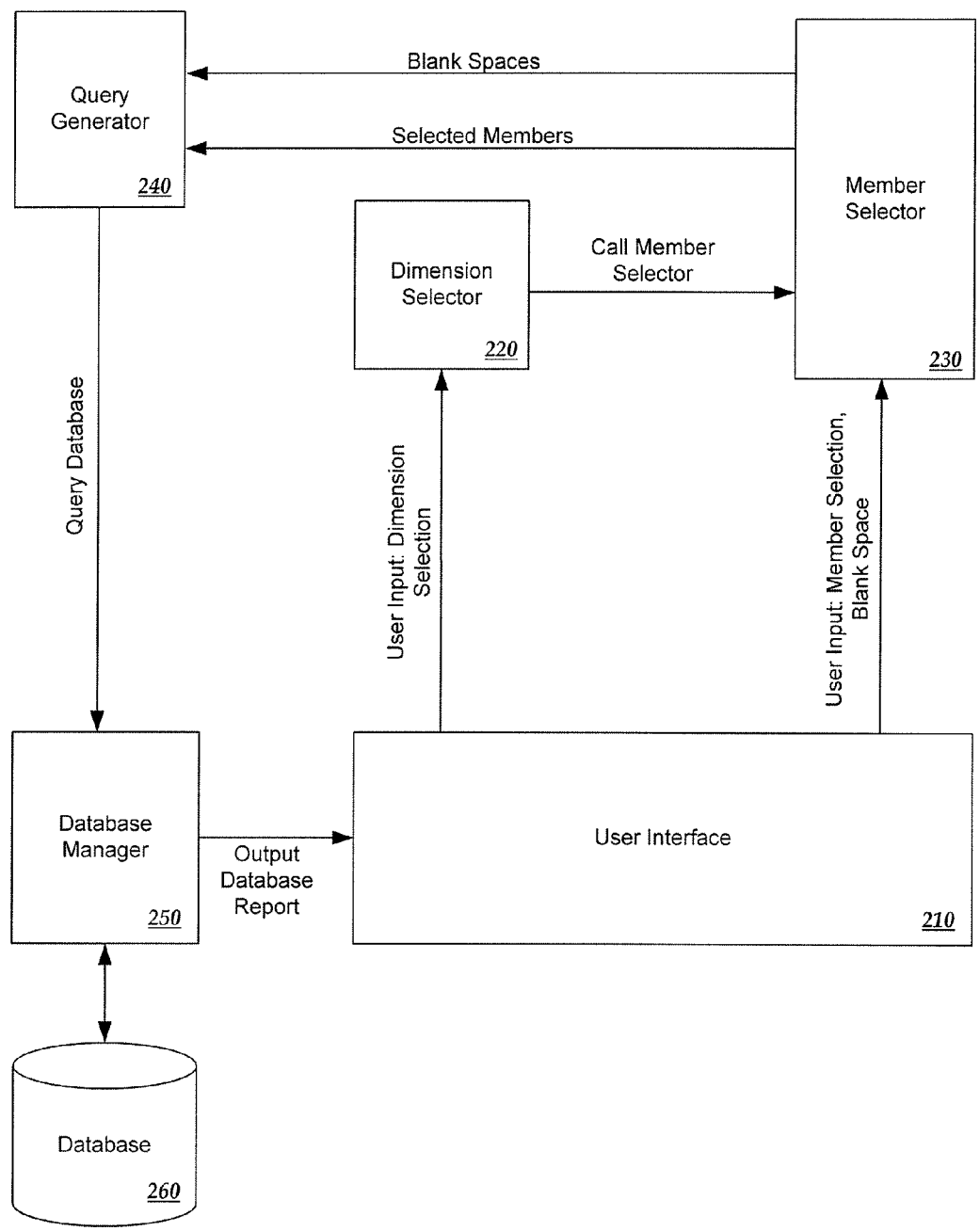
FIG. 2 is a block diagram indicating data flow in a process to create a database query containing blank space.

FIG. 2 shows a block diagram indicating data flow in a process to create a database query containing blank space. A user interface 210 may receive user input from a user and transmit information to the user. For example, the user interface 210 may allow a user to choose dimensions of a database to be included in a report, to select particular members of the chosen dimensions and to insert blanks into the chosen dimensions of the database. The user interface may be coupled to a dimension selector 220 and a member selector 230 to allow transmission of the selected dimensions and members respectively.

Members and dimensions are both organizational elements of a database, such as a multidimensional database. Information stored in a multidimensional database may be first divided into groups called dimensions. Each dimension may describe a specific category of information stored in the database. For example, if the database contains information related to a manufacturing or distributing company, the database may include dimensions such as products, customers, geographical regions, and financial accounts. Dimensions of a database may in turn be further divided into smaller divisions called members. Each member of a dimension may describe a specific type of information stored within the dimension. For example, a products dimension may have members containing information related to a specific product, such as televisions, radios, and cameras.

The user input selecting dimensions may be transmitted to a dimension selector 220. The dimension selector 220 may be configured to associate the chosen dimensions with rows or columns of an output report. In addition, the dimension selector 220 may call the member selector 230 to allow interaction with the chosen dimensions. As described below, the member selector 230 is a device that allows selection of dimension members. In some implementations, an instance of the member selector 230 may allow selection of members of a particular dimension. For example, when a dimension is chosen, the member selector 230 may be invoked to facilitate the selection of members of the chosen dimension.

Once called, the member selector 230 may allow for selection of members of the chosen dimension. The member selector 230 may also allow manipulation of the list of selected members. For example, the member selector 230 may receive input from the user interface 210 indicating which members of the dimension should be selected and displayed in the report. In addition, the member selector 230 may receive input from the user interface 210 indicating that a blank space should be added within the dimension. The member selector 230 may be configured to transmit information to a query generator 240 indicating which members have been selected and where the blank spaces should be located.

The query generator 240 may then create a database query in response to the received information. As described below, the database query may indicate which dimensions of the database are associated with rows of a database report and which dimensions of the database are associated with columns of a database report. Further, the database query may declare null members corresponding to the blanks inserted in the dimensions. Further still, the database query may also indicate which members of the dimensions, including null members associated with blanks, will be included in the report.

The query generator 240 may be coupled to a database manager 250 which may in turn be coupled to a database 260. The database manager 250 may process a query received from the query generator 240. The processed query may be executed by the database manager 250 on the database 260 to retrieve the information needed to create an output report in response to the database query. The database manager 250 may also be coupled to the user interface 210 to allow transmission of the output report to the user interface 210. The user interface 210 may display the resulting report to the user, allowing the user to then save the report, or modify the content of the report through the process described above.

FIG. 3 shows a screen display of a window 300 illustrating an implementation of a member selector that contains two panes: a members pane 310 and a selected members pane 320. The members pane 310 displays members of a particular dimension, such as a member 315. In this example, because the user selected the "Time" dimension, the members pane 310 contains a list of the members of the "Time" dimension. The window 300 may also include an add button 330. A user may use the add button 330 to select a member of the dimension by, for example, manipulating a pointing device such as a mouse to direct a cursor over a member to highlight the selected member. As shown in the members pane 310, the user has highlighted the member 315. Once a member is highlighted, it may be added to the list of selected members by clicking the add button 330. In other implementations, rather than directly selecting the highlighted member, the add button 330 may select members based on a hierarchical relationship to the highlighted member. For example, the add button 330 may select the parent of the highlighted member, or the children of the highlighted member. In other implementations the add button 330 may select the grandparent of the highlighted member, the siblings of the highlighted member, both the highlighted member and its relatives, or any other combination of relationships, as is understood by those of ordinary skill in the art.

Once selected, the member 315 may then be displayed in the selected members pane 320. The selected members pane 320 may display the names of the selected members of the dimension. As described in more detail below, each member selected may be included in the query structure generated where, in turn, it will be included in the database report.

Figure 4:
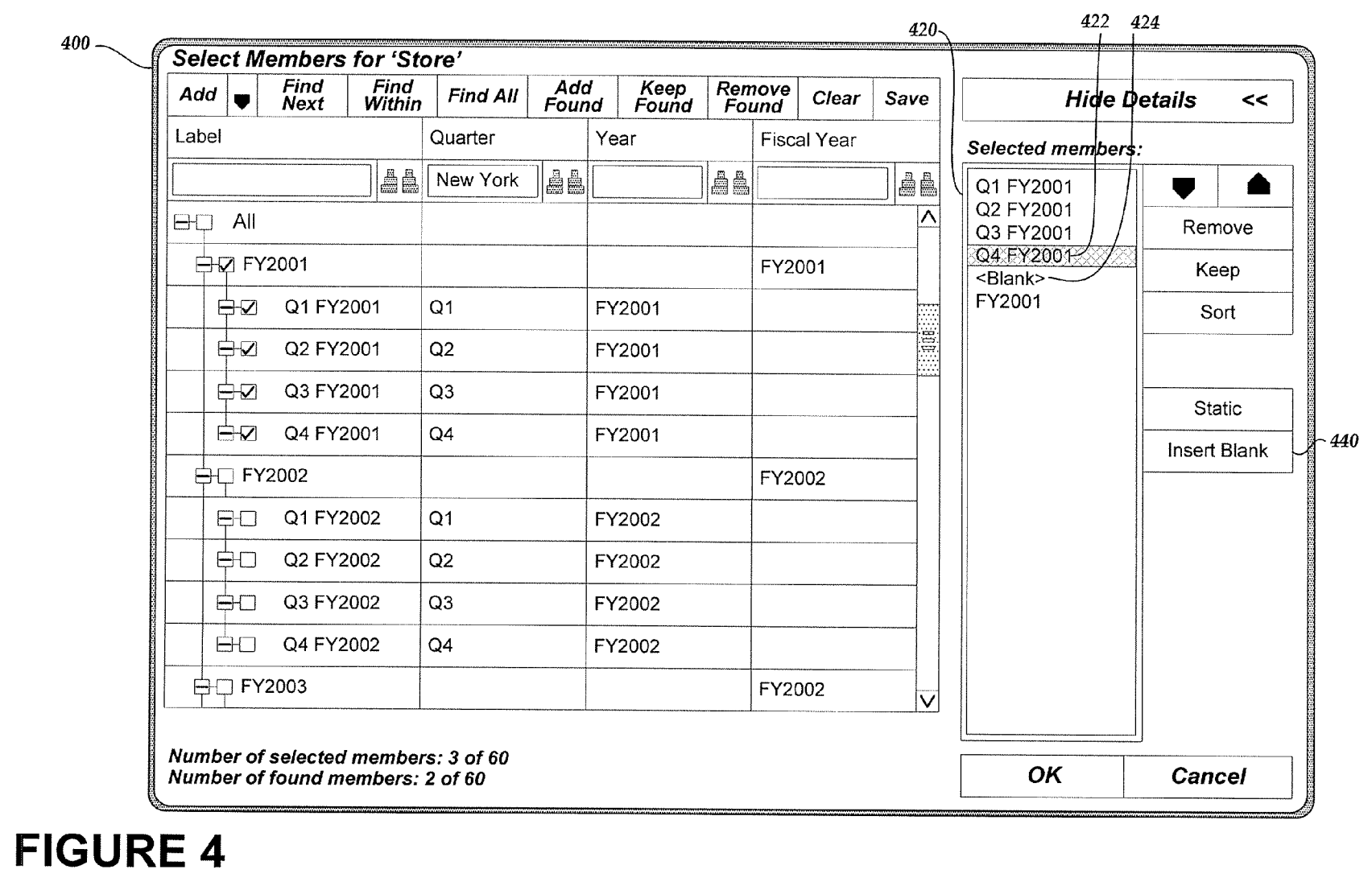

FIG. 4 shows a screen display of a window 400 illustrating an implementation of a member selector. The window 400 may be similar to the window 300 of FIG. 3. The window 400 illustrates the insertion of a blank. The window 400 includes a selected members pane 420, which may be similar to that of the selected members pane 320, that display the names of the members selected. To insert a blank at a particular location, the user may click a mouse curser on a selected member to highlight it, such as a selected member 422. Once a member is highlighted, a blank may be inserted beneath the highlighted member by clicking an insert blank button 440. The insert blank button 440 creates a new null member, and adds it to the list of selected members. The selected members pane 420 may also display an added blank member 424 at the location it is added by, for example, displaying "<Blank>." As described in more detail below, each blank member inserted will be declared and included in the database query generated where it will in turn be included in the database report.

FIG. 5 shows an implementation of a query 500 generated that includes the blank member 424. The query 500 may include a blank declaration 510. The blank declaration 510 may define which dimension that blank member is to be included within. In this example, the blank member 424 is added to the "Time" dimension. In addition, the blank declaration 510 may define a null caption associated with the blank member 424. A null caption causes no data to be displayed in the location of the report associated with the blank member 424.

The query 500 may include a first list 520 of the selected members of a first dimension. In this case, the first list 520 is associated with the "Time" dimension. The first list 520 may define the order the members of the first dimension will be displayed. Further, because the blank member 424 was also added to the "Time" dimension, the list 520 includes an entry 525 for the blank member 424. The query 500 may also include an instruction 530 to define whether the first list 520 is associated with columns or rows of the database report. In this case, the instruction 530 specifies that the first list 520 is associated with columns of the report.

The query 500 may also contain a second list 540 of the selected members of a second dimension. In this case, the second list 540 is associated with the "Account" dimension. The second list 540 may define the order the members of the second dimension are selected. The query 500 may also include an instruction 550 to define whether the second list 540 is associated with columns or rows of the database report. In this case, the instruction 550 specifies that the second list 540 is associated with rows of the report.

FIG. 6 shows a sample report 610 generated in response to the query 500. The report 600 may contain a series of columns 610, shown here labeled as A-G 611-617. The report 600 may also contain a series of rows 620, shown here labeled as 1-21 621-624.

Each row and column may contain information or labels. For example, the first row includes labels of the member displayed in the columns 612-617. Because the dimension displayed across columns of the report is the "Time" dimension, the labels displayed in the first row 621 are the labels of the selected members of the "Time" dimension. Similarly, the first column 611 includes labels of the information displayed in the rows 622-624. Because the dimension displayed across rows of the report is the "Account" dimension, the labels displayed in the first column 611 are the labels of the selected members of the "Account" dimension.

Instead of labels, the second column 612 may contain information associated with the first member of the dimension of the database associated with columns of the report. In this example, the dimension associated with columns is "Time." Thus, the column 612 contains information associated with the time of the first selected member. More specifically, the column 612 contains information associated with the first quarter of the 2006 fiscal year. Similarly, the column 613 contains information associated with the time of the second selected member. More specifically, the column 613 contains information associated with the second quarter of the 2006 fiscal year.

The column 616 contains information associated with the fifth selected member of the "Time" dimension. In this case, the fifth selected member is the blank member. Because the blank member contains a null caption as its label, no label is displayed at the row 621 and the column 616. Further, as the blank member contains no data, no data is displayed at the rows 622-624 of the column 616. Thus, a blank column is displayed at the column 616.

Method of Creating a Query Containing Blank Spaces

Figure 7:
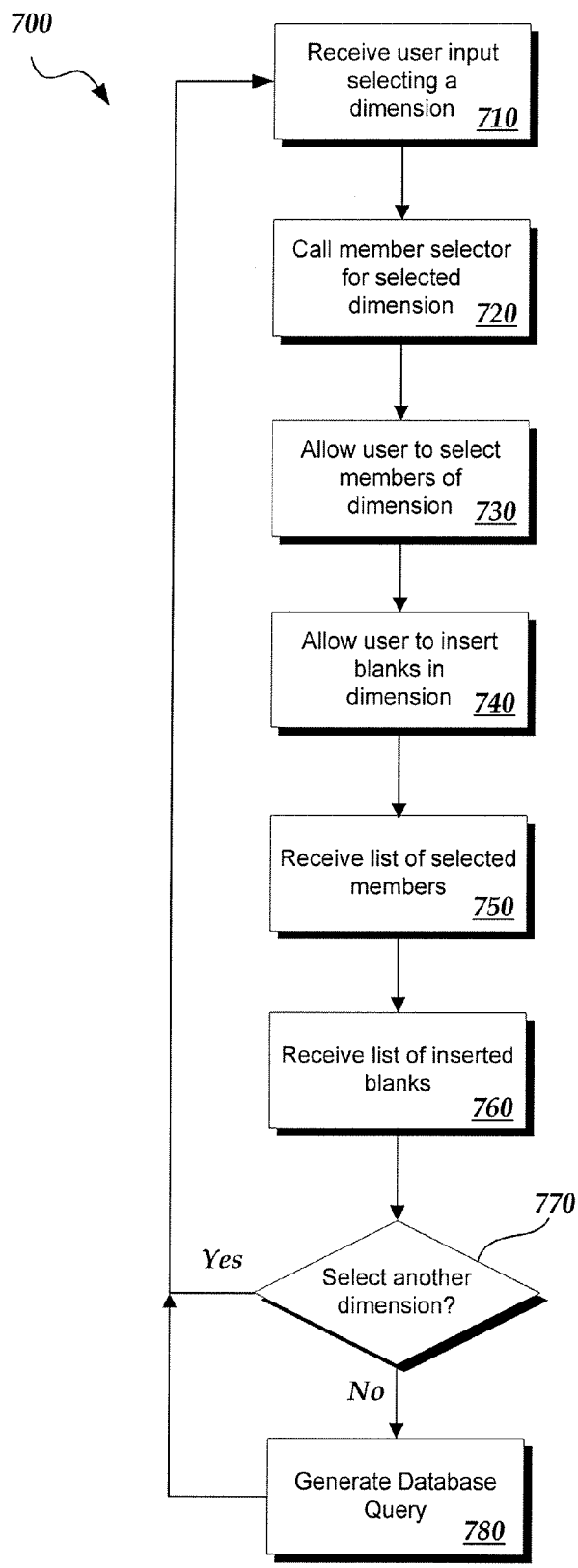
FIG. 7 is a flow diagram illustrating an implementation of a process for creating a database query including a blank member.

FIG. 7 presents a flow diagram 700 illustrating an implementation of a method for creating a database query containing blank spaces. At 710, the process begins when user input choosing a specific dimension is received. The dimension chosen at 710 is the dimension within which the user would like to add the blank space. For example, if a blank row is desired, a dimension associated with rows of the report would be chosen. On the other hand, if a blank column is desired, a dimension associated with columns of the report would be chosen. At 720, the member selector for the chosen dimension is called.

At 730, the member selector then allows the user to select members of the chosen dimension. The members selected will correspond to the members of the dimension the user wishes to be displayed in the report. For example, a dimension may include many members and a user may wish to view data associated with only three of the members. Thus, at 730, the user would select the three members the user wishes to include in the report. At 740, the user may choose to insert a blank. For example, if the user has selected three members of the dimension, and the user would like to see a blank in the final report between the second and third members, the user may insert a blank as described above in relation to FIG. 4. Thus, the user may define the specific location to insert the blank at 740.

After the list of selected members is created, at 750, the list is received from the member selector. This list may contain, in addition to which members are selected, the order the members are to be displayed. At 760, the list of blanks to be inserted is received. This list may also contain the order and position of each blank. In some examples, the list of blanks may be included in the same file as the list of members selected. In other examples, the list of blanks may be included in a separate file as the list of members selected.

At 770, a determination is made as to whether the user has selected another dimension. If a user has selected another dimension, the flow illustrated in diagram 700 returns to 710 and the process is repeated for the next dimension. If it is determined that the user has not selected another dimension, the flow illustrated in the diagram 700 continues to 780. At 780, a database query is generated containing the information received. As described above in relation to FIG. 5, the database query may contain information such as which dimensions should be included in the report, which members of the included dimension should be displayed in the report, the order of the members, definition of null members corresponding to the blanks, the dimension the blank is associated with, a specific location for each blank, etc. In some examples, the database query may take the form of Multidimensional Expression (MDX) statements. In other examples, the database query may take the form of Structured Query Language (SQL) statements. In still other examples, the database query may be defined in any other query language.

Insertion of a Blank Row and a Blank Column

Similar to the preceding example in which a report was generated that contained a blank column, a report may also be generated that contains both one or more blank rows and one or more blank columns. In this case, a user may associate a first dimension of the database with columns of a report. The user may then define which members of the first dimension should be displayed in the report. The user may also insert a blank member in that dimension at a location desired. This may be done, for example, through the use of a member selector similar to that shown in FIG. 3. The user may associate a second dimension of the report with rows of the report. The user may then define which members of the second dimension should be displayed in the report. The user may also insert a blank member in the second dimension at a location desired. This may also be done, for example, through the use of a member selector similar to that shown in FIG. 3.

FIG. 8 shows an implementation of query 800 generated that includes a blank row and a blank column. The query 800 may include a first blank declaration 810 to define a first blank member. The first blank declaration 810 may specify which dimension that blank member is to be included within. In this example, the first blank member is added to the "Time" dimension. In addition, the first blank declaration 810 may define a null caption associated with the first blank member. A null caption causes no data to be displayed in the location of the report associated with the first blank member. The query 800 may also include a second blank declaration 815 to define a second blank member. The second blank declaration 815 may specify which dimension that blank member is to be included within. In this example, the second blank is added to the "Account" dimension. In addition, the second blank declaration 815 may define a null caption associated with the second blank.

The query 800 may include a first list 820 of the selected members of a first dimension. In this case, the first list 820 is associated with the "Time" dimension. The first list 820 may define the order the members of the first dimension will be displayed. Further, because the first blank member was also added to the "Time" dimension, the first list 820 includes an entry 825 for the first blank member. The query 800 may also include an instruction 830 to define whether the first list 820 is associated with columns or rows of the database report. In this case, the instruction 830 specifies that the first list 820 is associated with columns of the report. Because the first blank member was added to a dimension associated with columns, the first blank member will cause a blank column to be displayed in the report.

The query 800 may include a second list 840 of the selected members of a second dimension. In this case, the second list 840 is associated with the "Account" dimension. The second list 840 may define the order the members of the second dimension will be displayed. Further, because the second blank member was also added to the "Account" dimension, the second list 840 includes an entry 845 for the second blank member. The query 800 may also include an instruction 850 to define whether the second list 840 is associated with columns or rows of the database report. In this case, the instruction 850 specifies that the second list 840 is associated with rows of the report. Because the second blank member was added to a dimension associated with rows, the second blank member will cause a blank row to be displayed in the report.

FIG. 9 shows an implementation of a report 900 generated that corresponds to the query 800. The report 900 may contain a series of columns 910, shown here labeled as A-G 911-917. The report 900 may also contain a series of rows 920, shown here labeled as 1-21 921-925.

Each row and column may contain information or labels. For example, the first column 911 includes labels of the members displayed across the rows 922-925. Because the dimension displayed across rows of the report is the "Account" dimension, the labels displayed in the first column 911 are the labels of the selected members of the "Account" dimension. The second column 912 may contain, rather than labels, information associated with the first member of the dimension of the database associated with columns of the report. In this example, the dimension associated with columns is "Time." Thus, the column 912 contains information associated with the time of the first selected member of the "Time" dimension. More specifically, the column 912 contains information associated with the first quarter of the 2006 fiscal year. Similarly, the column 913 contains information associated with the time of the second selected member of the "Time" dimension. More specifically, the column 913 contains information associated with the second quarter of the 2006 fiscal year.

The column 916 contains information associated with the fifth selected member of the "Time" dimension. In this case, the fifth selected member is the first blank member. Because the blank member contains a null caption as its label, no label is displayed at the row 921 and the column 916. Further, as the blank member contains no data, no data is displayed at the rows 922-925 of the column 916. Thus, a blank column is displayed at the column 916.

The first row 921 includes labels of the members displayed across the columns 912-917. Because the dimension displayed across columns of the report is the "Time" dimension, the labels displayed in the first row 921 are the labels of the selected members of the "Time" dimension. The second row 922 may contain, rather than labels, information associated with the first member of the dimension of the database associated with rows of the report. In this example, the dimension associated with rows is the "Account" dimension. Thus, the row 922 contains information associated with the account of the first selected member of the "Account" dimension. More specifically, the row 922 contains information associated with the sold units. Similarly, the row 923 contains information associated with the account of the second selected member of the "Account" dimension. More specifically, the row 923 contains information associated with price per unit.

The row 924 contains information associated with the third selected member of the "Account" dimension. In this case, the third selected member of the "Account" dimension is the second blank member. Because the blank member contains a null caption as its label, no label is displayed at the row 924 and the column 911. Further, as the second blank member contains no data, no data is displayed at the row 924 of the columns 912-917. Thus, a blank row is displayed at the row 924.

Figure 10:
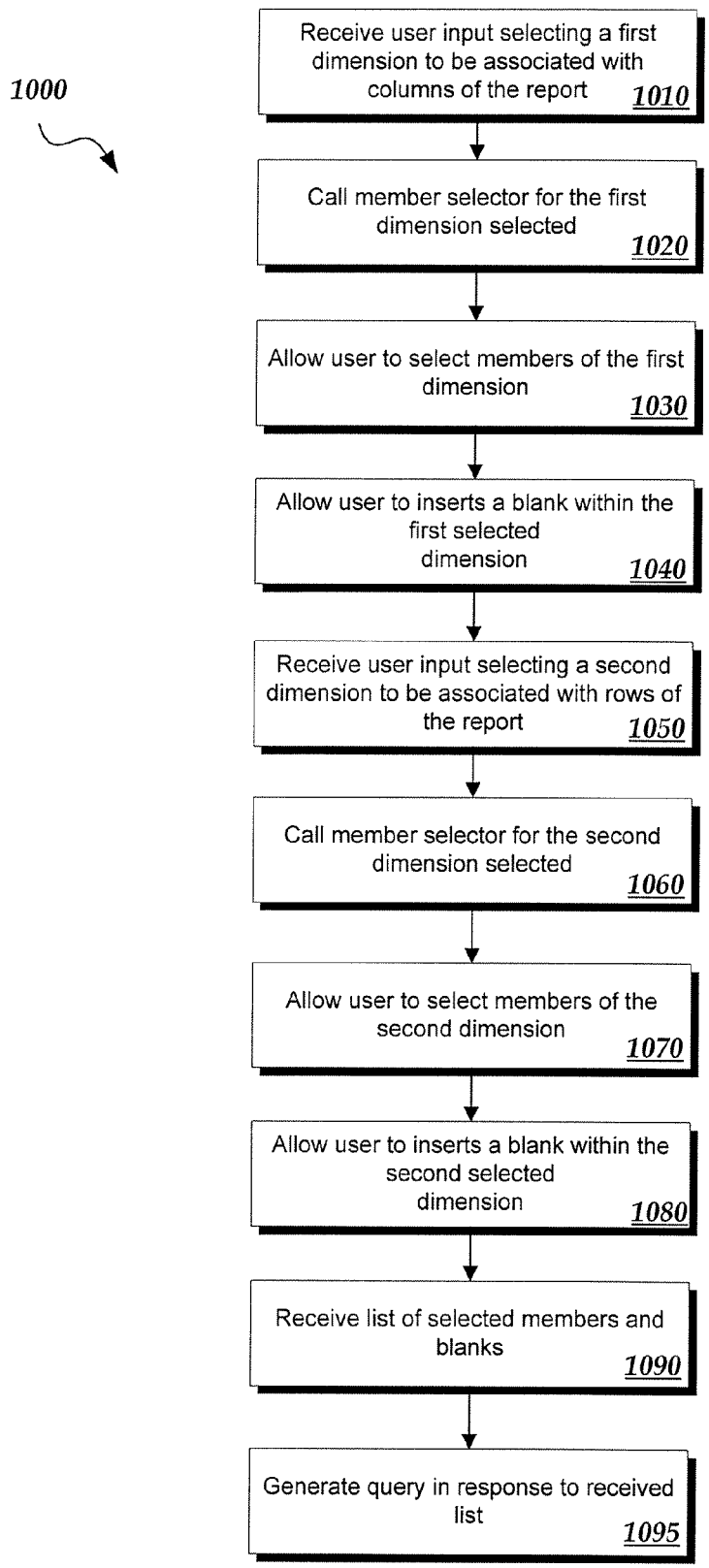
FIG. 10 is a flow diagram illustrating an implementation of a process for creating a database query including blank members.

FIG. 10 presents a flow diagram 1000 of an implementation of a method for creating a database query containing one or more blank columns and blank rows. At 1010, the process begins when user input choosing a first dimension to be associated with columns of the report is received. The dimension chosen at 1010 is the dimension within which the user would like to add the blank column. At 1020, the member selector for the first dimension chosen is called.

At 1030, the member selector then allows the user to select members of the first dimension. The members selected will correspond to the members of the dimension the user wishes to be displayed across columns of the report. For example, a dimension may include many members and a user may wish to view data associated with three of the members. Thus, at 1030, the user would select the three members the user wishes to be included in the report.

At 1040, the user may then insert a blank within the first chosen dimension. For example, if the user has selected three members of the dimension and the user would like to see a blank in the final report between the second and third members, a user may insert a blank as described above in relation to FIG. 4. Thus, the user may define the specific location to insert the blank column at 1040.

At 1050, user input choosing a second dimension to be associated with rows of the report is received. The dimension chosen at 1050 is the dimension within which the user would like to add the blank row. At 1060, an instance of the member selector is called for the second dimension chosen. At 1070, the member selector then allows the user to select members of the second dimension. The members selected will correspond to the members of the second dimension the user wishes to be displayed across rows of the report. At 1080, the user may insert a blank within the second chosen dimension as described above. Thus, the user may also define the specific location to insert the blank row at 1080.

After the list of members selected and blanks inserted is defined by the user at 1010-1080, at 1090, this list is received at the query generator. This list may contain, in addition to which members are selected, the order the members are to be displayed. In some examples, the list of blanks may be included in the same file as the list of members selected. In other examples, the list of blanks may be included in a separate file as the list of members selected. At 1095, a database query is generated containing the information received. As described above, the database query may contain information, such as which dimensions should be included in the report, which members of the included dimension should be displayed in the report, the order of the members, definition of null members corresponding to the blanks, the dimension the blank is associated with, a specific location for each blank, etc. In some examples, the database query may take the form of MDX statements. In other examples, the database query may take the form of SQL code. In still other examples, the database query may be defined in any other language known to those skilled in the art.

In this example, a blank space was inserted within a row and a column. In other implementations, any number of blank spaces may be inserted. For example, multiple blank spaces may be inserted within a column and a single blank space inserted within a row. In other examples, multiple blank spaces may be inserted within rows and columns. In still other examples, multiple blank spaces next to each other may be inserted to provide a larger blank space.

Insertion of Blank Space in a Cross-Joined Report

Similar to the preceding examples, blank space may be inserted into a cross-joined report. As is understood by those of skill in the art, a crossjoined report is a report in which multiple dimensions of a database are displayed on rows of a report, and/or in which multiple dimensions of a database are displayed across columns of a report. In this example, two dimensions of a database are displayed across rows of a report and the user would like to insert a blank row.

The user may associate a first and second dimension of the database with rows of a report. The user may then define which members of the first and second dimensions should be displayed in the report. As described below, the user may also insert a blank in both the first a second dimension of the report to create a blank row in the database report. This may be done, for example, through the use of a member selector similar to that shown in FIG. 3. The user may associate a third dimension of the database with columns of the report. The user may then define which members of the third dimension should be displayed in the report. This may also be done, for example, through the use of a member selector similar to that shown in FIG. 3.

FIG. 11 shows an implementation of a generated query 1100 that includes a blank cross-joined row. The query 1100 may include a first blank declaration 1110 to define a blank member of the first cross-joined dimension. In this case, the first blank member is added to the "Account" dimension. In addition, the first blank declaration 1110 may define a null caption associated with the first blank member. A null caption causes no data to be displayed in the location of the report associated with the first blank member. The query 1100 may also include a second blank declaration 1115 to define a blank member of the second cross-joined dimension. In this case, the second blank is added to the "Product" dimension. In addition, the second blank declaration 1115 may define a null caption associated with the second blank.

The query 1100 may include a first list 1120 of the selected members of the first dimension. In this case, the first list 1120 is associated with the "Time" dimension. The first list 1120 may define the order the members of the first dimension will be displayed. The query 1100 may also include an instruction 1130 to define whether the first list 1120 is associated with columns or rows of the database report. In this case, the instruction 1130 specifies that the first list 1120 is associated with columns of the report.

The query 1100 may include a second list 1140 of the selected members of the cross-joined dimensions. In this case, the second list 1140 is associated with the "Account" dimension and the "Product" dimension. The second list 1140 may define the order the members of the cross-joined dimensions are selected. Further, because the first and second blank members were added to the "Account" dimension and the "Product" dimension, the second list 1140 includes entries 1145 for the cross-joined blank members. The query 1100 may also include an instruction 1150 to define whether the second list 1140 is associated with columns or rows of the database report. In this case, the instruction 1150 specifies that the second list 1140 is associated with rows of the report. Because the cross-joined blank members were added to a dimension associated with rows, the cross-joined blank members will cause a blank row to be displayed in the report across the cross-joined rows, as explained further below with reference to FIG. 12.

FIG. 12 shows an implementation of a report 1200 generated that corresponds to the query 1100. The report 1200 may contain a series of columns 1210, shown here labeled as A-G 1211-1217. The report 1200 may also contain a series of rows 1220, shown here labeled as 1-21 1221-1231.

Each row and column may contain information or labels. For example, the first column 1211 includes labels of the members of the first dimension of the database displayed across the rows 1222-1231. Because the first dimension displayed across the rows of the report is the "Account" dimension, the labels displayed in the first column 1211 are labels of the selected members of the "Account" dimension. Similarly, the second column 1212 includes labels of the members of the second dimension of the database displayed across the rows 1222-1231. Because the second dimension displayed across rows of the report is the "Product" dimension, the labels displayed in the second column 1212 are labels of the selected members of the "Product" dimension. Two columns containing labels are present because two rows of the report are cross-joined, and thus two sets of labels may be used.

Instead of labels, the column 1213 may contain information associated with the first member of the dimension of the database associated with columns of the report. In this example, the dimension associated with columns is "Time." Thus, the column 1213 contains information associated with the time of the first selected member of the "Time" dimension. More specifically, the column 1213 contains information associated with the first quarter of the 2006 fiscal year.

The row 1221, as the first row, includes labels of the members displayed across the columns 1213-1217. Because the dimension displayed across columns of the report is the "Time" dimension, the labels displayed in the first row 1221 are labels of the selected members of the "Time" dimension. The second row 1222 may contain, rather than labels, information associated with the first member of the first dimension associated with rows and with the first member of the second dimension associated with rows. In this example, the first dimension associated with rows is the "Account" dimension and the second dimension associated with rows is the "Product" dimension. Thus, the row 1222 contains information associated with the account of the first selected member of the "Account" dimension and with the product of the first selected member of the "Product" dimension. More specifically, the row 1222 contains information associated with sold units of accessories.

The row 1223 contains information associated with the account of the first selected member of the "Account" dimension and with the product of the second selected member of the "Product" dimension. More specifically, the row 1223 contains information associated with sold units of cards. The Row 1224 contains information associated with the account of the first selected member of the "Account" dimension and with the product of the last selected member of the "Product" dimension. More specifically, the row 1224 contains information associated with sold units of fixed lines.

Similarly, the row 1225 contains information associated with the account of the second selected member of the "Account" dimension and with the product of the first selected member of the "Product" dimension. More specifically, the row 1225 contains information associated with price per unit of accessories. The row 1226 contains information associated with the account of the second selected member of the "Account" dimension and with the product of the second selected member of the "Product" dimension. More specifically, the row 1226 contains information associated with price per unit of cards. The Row 1227 contains information associated with the account of the second selected member of the "Account" dimension and associated with the product of the last selected member of the "Product" dimension. More specifically, the row 1227 contains information associated with price per unit of fixed lines.

The row 1228 contains information associated with the crossjoined blank members. Because both blank members have been cross-joined, the cross-joined combination of the blank members occupies a single row. Further, because the blank members contain null captions as their labels, no label is displayed at the row 1228. The blank members contain no data and thus no data is displayed at the row 1228 of the columns 1212-1217. Therefore, a blank row is displayed at the row 1224. The rows 1229-1231 may follow a pattern similar to that of the rows 1222-1224 and the rows 1225-1227.

Figure 13:
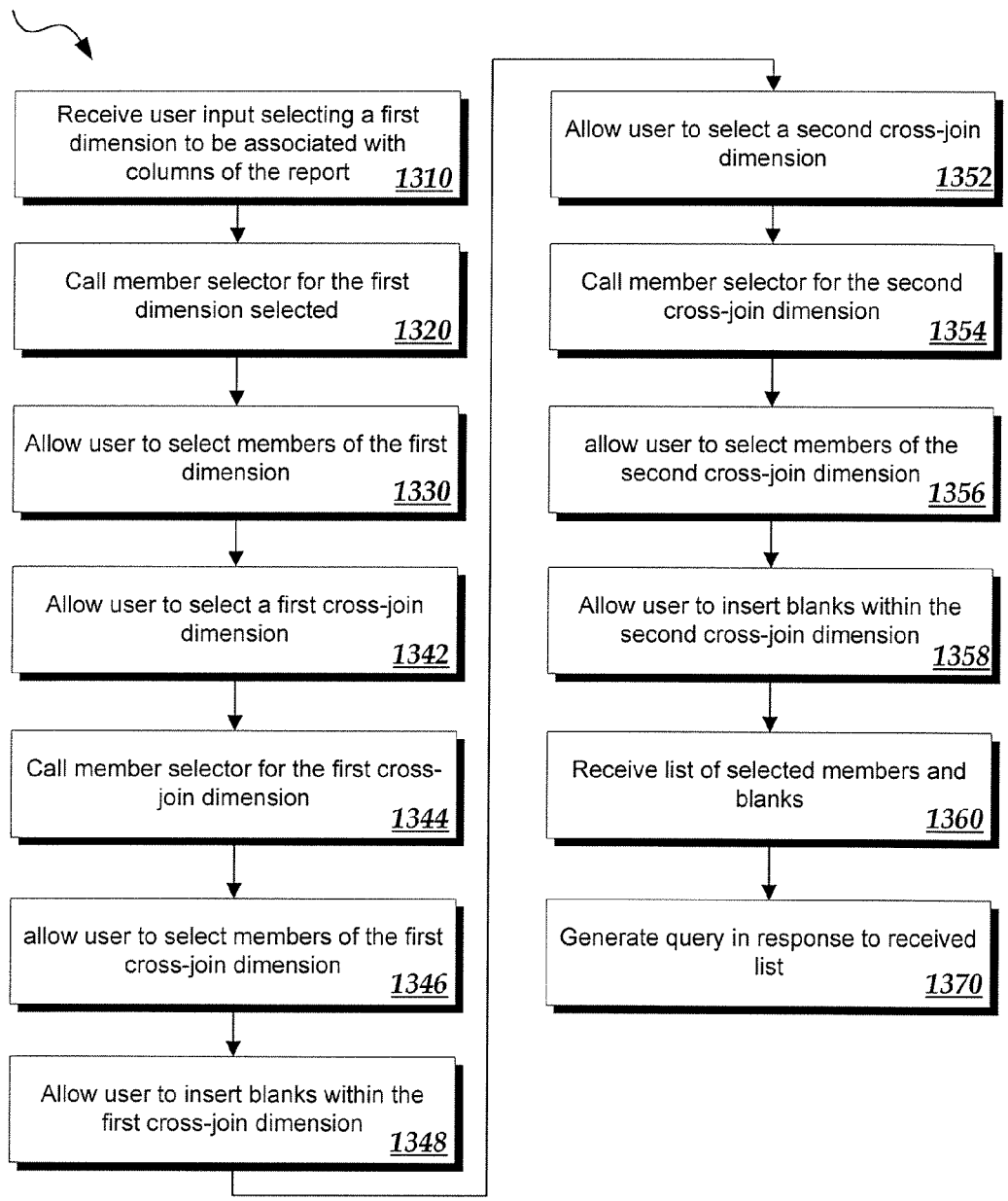
FIG. 13 is a flow diagram illustrating an implementation of a process for creating a database query including cross-joined blank members.

FIG. 13 presents a flow diagram 1300 of an implementation of a method for creating a database query containing a crossjoined blank row. At 1310, the process begins when user input choosing a first dimension to be associated with columns of the report is received. At 1320, the member selector for the first dimension chosen is called. At 1330, the member selector then allows the user to select members of the first dimension. The members selected will correspond to the members of the dimension the user wishes to display across columns of the report. For example, a dimension may include many members and a user may wish to view data associated with three of the members. Thus, at 1330, the user would select the three members the user wishes to be included in the report.

At 1342, user input selecting a second dimension associated with the cross-joined rows of the report is received. The dimension chosen at 1342 is the first cross-join dimension that the user would like to add the blank cross-joined row within. At 1344, an instance of the member selector is called for the first cross-join dimension chosen. At 1346, the member selector then allows the user to select members of the first cross-join dimension. The members selected will correspond to the members of the first cross-join dimension the user wishes to be displayed across rows of the report. At 1348, the user may insert a blank within the first cross-join dimension. Thus, the user may define the specific location to insert the blank row at 1348.

At 1352, user input choosing a third dimension also associated with the cross-joined rows of the report is received. The dimension chosen at 1352 is the second cross-join dimension that the user would like to add the blank cross-joined row within. At 1354, an instance of the member selector is called for the second cross-join dimension. At 1356, the member selector then allows the user to select members of the second cross-join dimension. The members selected will correspond to the members of the second cross-join dimension the user wishes to be displayed across rows of the report. At 1358, the user may insert a blank within the second cross-join dimension. Thus, the user may define the specific location to insert the blank row at 1358.

After the list of members selected and blanks inserted is defined by the user at 1310-1358, at 1360, this list is received at the query generator. This list may contain, in addition to which members are selected, the order the members are to be displayed. In some examples, the list of blanks may be included in the same file as the list of members selected. In other examples, the list of blanks may be included in a separate file as the list of members selected. At 1370, a database query is generated containing the information received. As described above, the database query may contain information, such as which dimensions should be included in the report, which members of the included dimension should be displayed in the report, the order of the members, definition of null members corresponding to the blanks, the dimension the blank is associated with, a specific location for each blank, etc. In some examples, the database query may take the form of MDX code. In other examples, the database query may take the form of SQL code. In still other examples, the database query may be defined in any other language known to those skilled in the art.

In this example, a single blank space was inserted within a cross-joined row. In other implementations, any number of blank spaces may be inserted within any number of cross-joined dimensions. For example, multiple blank spaces may be inserted between a cross-joined column. In other examples, blank spaces may be inserted within a row and within a cross-joined column. In still other examples, blank space by be inserted through multiple cross-joined rows and columns.

Insertion of Blank Space with Automatic Update

Similar to the above examples, a blank space may be inserted into a database report and preserve the position of the blank space when the database report dynamically is updated when the contents of the database change. For example, a user may wish a report to contain information about two particular sets of members, such as a parent member of a dimension and all of its children. In some implementations, a user may include information associated with the individual children by individually select each child member. The user may also include information associated with the parent member by individual selecting the parent member.

In order to increase the readability, the user may wish to insert a blank space between the two sets of members, such as the children members and the parent member. This blank space may be inserted as described above in relation to FIG. 4. Where the members are individually selected, if the database contents change and an additional child member is added to the database, the user may update the selection manually to include the new child member. The selection may be updated by returning to the member selector for the corresponding dimension, and select the new child member.

In an alternative implementation, rather than selecting members individually, the user may select the groups of members based on set operations. For example, rather than selecting the child members individually, the user may highlight the parent member and indicate a dynamic selection of all of its children. This may be done, for example, through the use of a member selector similar to that shown in FIG. 3. The parent member itself may also be selected. In this manner, only two selections are made: a dynamic selection of the children of the parent member, and the parent member itself.

A blank whose position will be automatically updated with changes in the database may then be inserted between the two members to produce the desired results. A user may simply highlight the dynamic selection of the children members and add a blank beneath it as described above in relation to FIG. 4. Because the children are selected dynamically, if the database contents are modified and the children of the parent member change, the blank space will remain in a position separating the parent member from the child members.

FIG. 14 shows an implementation of a generated query 1400 that includes a blank row that will dynamically remain as a divider between a parent member and children of the parent member. The query 1400 may include a declaration 1410 to define a blank member. The blank declaration 1410 may specify which dimension that blank member is to be included within. In this example, the blank member is added to a "Product" dimension. In addition, the blank declaration 1410 may define a null caption associated with the blank member. A null caption causes no data to be displayed in the location of the report associated with the first blank member The query 1400 may include a first list 1420 of the selected members of a first dimension. In this case, the first list 1420 is associated with the "Time" dimension. The first list 1420 may define the order the members of the first dimension will be displayed. The query 1400 may also include an instruction 1430 to define whether the first list 1420 is associated with columns or rows of the database report. In this case, the instruction 1430 specifies that the first list 1420 is associated with columns of the report.

The query 1400 may include a second list 1440 of the selected members of a second dimension. In this case, the second list 1440 is associated with the "Product" dimension. The second list 1440 may define the order the members of the second dimension are displayed. The second list 1440 indicates that three members of the second dimension have been selected. A first selection 1442 may be included in the second list 1440 that dynamically selects children of a parent member. Although represented in the query 1400 as a single selection, the selected children may be displayed in a resulting report as a plurality of individual children. A second selection 1444 may also be included in the second list 1440. In this case, the second selection 1444 is the blank member. A third selection 1446 may also be included in the second list 1440 that selects the parent member.

The query 1400 may also include an instruction 1450 to define whether the second list 1440 is associated with columns or rows of the database report. In this case, the instruction 1450 specifies that the second list 1440 is associated with rows of the report. Because the blank member was added to a dimension associated with rows, the blank member will cause a blank row to be displayed in the report. Additionally, because the plurality of children was dynamically defined, when the database contents are updated and children are added or removed the blank space will dynamically remain as a divider between the children and parent member.

FIG. 15 shows a sample report 1400 generated in response to the query 1400. The report 1500 may contain a series of columns 15 10, shown here labeled as A-G. The series of columns 1510 may include individual columns 1511-1517. The report 1500 may also contain a series of rows 1520, shown here labeled as 1-21. The series of rows 1520 may include individual rows 1521-1524.

Each row and column may contain information or labels. For example, the first column 1511 includes labels of the members displayed across the rows 1522-524. Because the dimension displayed across rows of the report is the "Account" dimension, the labels displayed in the first column 1511 are the labels of the selected members of the "Account" dimension. The second column 1512 may contain, rather than labels, information associated with the first member of the dimension of the database associated with columns of the report. In this example, the dimension associated with columns is "Time." Thus, the column 1512 contains information associated with the time of the first selected member of the "Time" dimension. More specifically, the column 1512 contains information associated with the first quarter of the 2006 fiscal year. Similarly, the column 1513 contains information associated with time of the second selected member of the "Time" dimension. More specifically, the column 1513 contains information associated with the second quarter of the 2006 fiscal year.

The first row 1521 includes labels of the members displayed across the columns 1512-1517. Because the dimension displayed across columns of the report is the "Time" dimension, the labels displayed in the first row 1521 are the labels of the selected members of the "Time" dimension. The second row 1522 may contain, rather than labels, information associated with the first member of the dimension of the database associated with rows of the report. In this example, the dimension associated with rows is the "Product" dimension. As described above, individual children of the selected parent member were not individual selected but rather selected based on their relationship to the parent member. Although not individually selected, each individual child is separately displayed in the report. For example, the row 1522 contains information associated with the product of the first selected child of the "Product" dimension. More specifically, the row 1522 contains information associated with the televisions. Similarly, the row 1523 contains information associated with the product of the second selected child of the "Product" dimension. More specifically, the row 1523 contains information associated with the radios.

The row 1524 contains information associated with the third selected member of the "Product" dimension. In this case, the third selected member of the "Product" dimension is the blank member because there were two children of the selected parent member. Because the blank member contains a null caption as its label, no label is displayed at the row 1524 and the column 1511. Further, as the blank member contains no data, no data is displayed at the row 1524 of the columns 1512-1517. Thus, a blank row is displayed at the row 1524. Following the blank row, the row 1525 contains information associated with the product of the selected parent member of the "Product" dimension. More specifically, the row 1522 contains information associated with the electronics in general.

In this example, a single blank space was dynamically inserted between a parent member and its children. In other implementations, any number of blank spaces may be inserted between multiple sets of members selected by any set operation. For example, blank space may be inserted between groups of members related as sibling members. In other examples, blank spaces may be inserted between a grandparent member and its grandchildren. In still other examples, blank space by be dynamically inserted in both rows and columns of a database, or though a cross-joined report. That is, although other examples above may refer to selection of individual members. In these examples, selection of sets of members, rather than individual members, may also be performed to provide a greater range of functionality. In such a case where a set of members is selected, the blank spaces may also be dynamically inserted. For example, in a cross-joined dimension a blank space may be inserted between two sets of members that are dynamically selected, thus allowing the blank space to dynamically update with changes in the underlying database.

The above specification, examples and data provide a complete description of the manufacture and use of the composition of the invention. Since many implementations of the invention can be made without departing from the spirit and scope of the invention, the invention resides in the claims hereinafter appended.

We claim:

1. A computer-implemented method comprising:
   receiving a request for a report including data to be retrieved from a database;
   providing a user input allowing for a blank space to be inserted in the report at a specified location; wherein the designation of the blank space is manually inserted at the specified location; wherein the blank space is a designation of one or more of: a blank row and a blank column;
   determining when the manually inputted designation of the blank space relates to the blank row;
   determining when the manually inputted designation of the blank space relates to the blank column; and
   in response to the manually input designation of the blank space: generating a database query including an instruction configured to add a member to the database that will produce a blank member at the specified location within the report when the report is rendered and the query is executed.

2. The method of claim 1, wherein the at least one added member further comprises a calculated member of the database.

3. The method of claim 1, wherein:
   the providing of the input further comprises providing a first input allowing for a blank space to be inserted in the report at a first specified location, and providing a second input allowing for a blank space to be inserted in the report at a second specified location; and
   the generating of the database query further comprises generating a database query including an instruction configured to:
      add a first member to a first dimension of the database that will produce a blank member at the specified location;
      add a second member to a second dimension of the database that will produce a blank member at the specified location; and
      execute a cross-join of the first dimension of the database with the second dimension of the database such that the first specified location and the second specified location coincide.

4. The method of claim 1, wherein the generating a database query further comprises generating a database query including an instruction configured to:
   associate a first dimension of the database with rows; and
   add a member to the database that will produce a blank row at the specified location.

5. The method of claim 4, wherein:
   the providing the input further comprises providing a first input allowing for a blank space to be inserted in the report at a first specified location, and providing a second input allowing for a blank space to be inserted in the report at a second specified location; and
   the generating of the database query further comprises generating a database query including an instruction configured to:

add a first member to the first dimension of the database that will produce a blank row at the specified location;

associate a second dimension of the database with rows;

add a second member to the second dimension of the database that will produce a blank row at the specified location; and execute a cross-join of the first dimension of the database with the second dimension of the database such that the first specified location and the second specified location coincide.

6. The method of claim 4, wherein the generating a database query further comprises generating a database query including an instruction configured to:

associate a first dimension of the database with columns; and add a member to the database that will produce a blank column at the specified location.

7. The method of claim 1, wherein the generating a database query further comprises generating a database query including an instruction configured to:

associate a first dimension of the database with columns; and add a member to the database that will produce a blank column at the specified location.

8. The method of claim 1, wherein the database further comprises a database configured for On Line Analytical Processing (OLAP).

9. The method of claim 1, wherein the generating a database query further comprises generating a database query using Multidimensional Expression (MDX) statements.

10. The method of claim 1, wherein the providing an input allowing for a blank space further comprises providing an input allowing for a blank space to be inserted in the report at a position relative to other members.

11. A computer-implemented method comprising:

selecting a first member of a first dimension of a database to be included at a first location in a report, the first member including first data to be retrieved from a database;

selecting a blank space to be added at a second location relative to the first location; wherein selecting the blank space comprises manually receiving the selection of the blank space from a user; wherein the selection of the blank space is a designation of where to insert the blank space within the report; wherein the blank space is a designation of one or more of: a blank row and a blank column; and generating a database query including:

a first instruction to retrieve first data included in the first member, wherein the first instruction is located at a first position in the query and wherein the first data will appear in the report at the first location; and a second instruction to retrieve a null set of data, wherein the second instruction is located at a second position in the query and wherein the null set of data will appear in the report at the second location; wherein when the database query is executed the report is rendered with the blank space as specified by the user.

12. The method of claim 11, further comprising:

causing the database query to be executed against the database;

receiving a result of the database query; and causing the result of the database query to be presented as the report, wherein the first data is presented at the first location and the null set of data appears as the blank space at the second location.

13. The method of claim 11, wherein the selecting a first member of the first dimension of the database further comprises selecting a first member of the first dimension of the database based on a hierarchical relationship to a related member, wherein the first member is to be included at a first location in the report.

14. The method of claim 13, further comprising:

in response to a database update, automatically selecting a second member of the first dimension of the database based on the hierarchical relationship to the related member, wherein the second member is to be included at a third location in the report and include third data to be retrieved from the database; and in response to the database update, generating an updated database query including:

a first instruction to retrieve first data included in the first member, wherein the first instruction is located at a first position in the query and wherein the first data will appear in the report at the first location;

a second instruction to retrieve a null set of data, wherein the second instruction is located at a second position in the query and wherein the null set of data will appear in the report at the second location; and a third instruction to retrieve third data included in the third member, wherein the third instruction is located at a third position in the query and wherein the third data will appear in the report at the third location.

15. The method of claim 13, further comprising:

causing the updated database query to be executed against the updated database in response to the automatically selecting the second member;

receiving an updated result of the database query; and causing the updated result of the updated database query to be presented as an updated report, wherein the first data is presented at the first location, the null set of data appears as the blank space at the second location, and the third data is presented at the third location.

16. The method of claim 11, wherein the second location is a location relative to a group comprising the first location and the third location.

17. A computer readable medium storing a query to a database including:

a declaration of at least one null member of the database containing a null caption; wherein the declaration of the at least one of at least one null member of the database containing the null caption is determined in response to a manual selection of a blank space; wherein the blank space is a designation of one or more of: a blank row and a blank column;

a first instruction to retrieve data included in at least one member of the database, wherein the data will appear in the report at a first location; and a second instruction to retrieve a null set of data associated with the at least one null member, wherein the null set of data will appear in the report at a second location; wherein when the database query is executed a report is rendered with the blank space as specified by the user.

18. The computer readable medium of claim 17, wherein the at least one member of the database further comprises a first member of a first dimension of the database to be included at a first location in the report, the first member including first data to be retrieved from the database; and the at least one null member further comprises a first null member of the first dimension of the database containing a first null caption to be included at the second location, wherein the second location is a location relative to the first location.

19. The computer readable medium of claim 18, wherein the at least one member of the database further comprises a second member of a second dimension of the database to be included at a third location in the report, the second member including second data to be retrieved from the database; and
the at least one null member further comprises a second null member of the second dimension of the database containing a second null caption to be included at a forth location relative to the second member.

20. The computer readable medium of claim 19, wherein the query further comprises a database query using Multidimensional Expression (MDX) statements.

* * * * *